No. 705,798. Patented July 29, 1902.
W. L. VON HARDENBERG.
TROLLEY.
(Application filed June 22, 1901.)

(No Model.)

Witnesses
Jane B. Kay
Alexander Mitchell

William L von Hardenberg Inventor
by Frederick S Numea Att'y

UNITED STATES PATENT OFFICE.

WILLIAM L. VON HARDENBERG, OF BROOKLYN, NEW YORK.

TROLLEY.

SPECIFICATION forming part of Letters Patent No. 705,798, dated July 29, 1902.

Application filed June 22, 1901. Serial No. 65,577. (No model.)

*To all whom it may concern:*

Be it known that I, WILLIAM L. VON HARDENBERG, a citizen of the United States, residing in New York city, borough of Brooklyn, county of Kings, and State of New York, have invented new and useful Improvements in Trolleys, of which the following is a specification, reference being had to the drawings accompanying and forming part of the same.

My invention relates particularly to the construction of trolley-wheels and trolleys to be used upon electric railways in connection with an overhead conductor.

Figure 1:
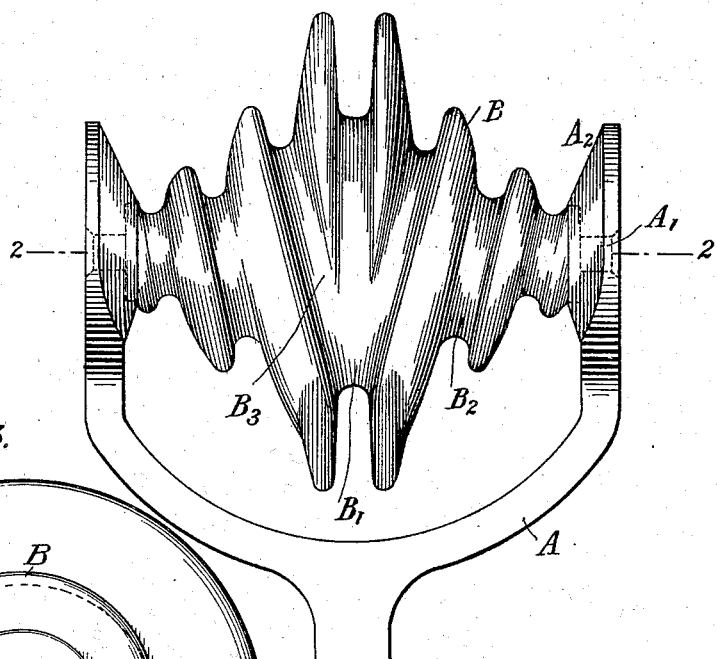
Figure 3:
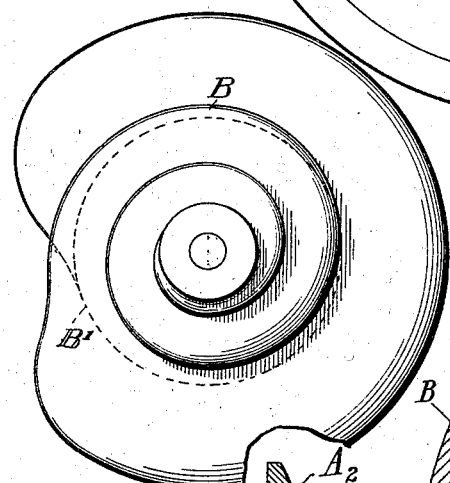
Figure 2:
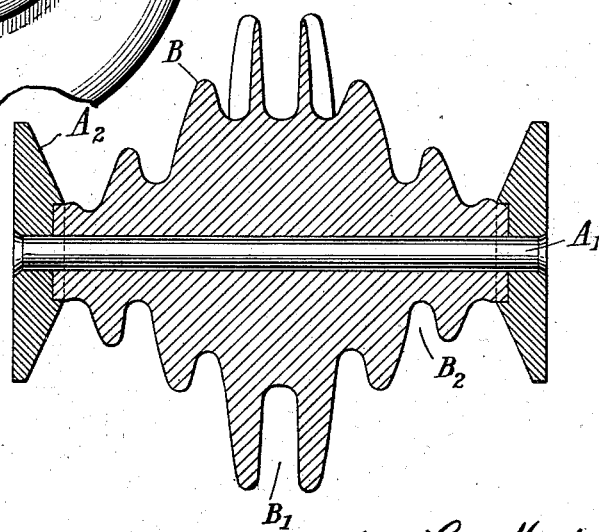

Figure 1 is a front view of my device. Fig. 2 is a sectional view on the line 2 2 of Fig. 1. Fig. 3 is a side view of the trolley-wheel.

The same reference characters designate similar parts in the various figures.

A is the trolley arm or end of the trolley-pole, attached to the electric-motor car in the usual way and being formed at the upper end with a yoke, the two arms $A^2$ of which are separated a considerable distance, as shown in Fig. 1. My trolley-wheel B is pivotally mounted in this yoke by passing a pivot-pin $A'$ through the same and riveting the ends of this pin into the end pieces $A^2$ of the yoke. As will be seen by reference to Fig. 2, an annular recess is formed in each of the arms, which accommodates the reduced end bearing portions of the trolley-wheel, so that they have a suitable bearing formed in such arms. My trolley-wheel, therefore, can turn readily about its bearing in the trolley-arm, and it will be manifest, of course, that suitable antifriction devices may be employed to reduce the friction of these parts. Suitable balls or rolls could be used at the bearing-points. It would also be possible to provide special lubricating means to keep this bearing lubricated at all times.

The trolley-wheel B is formed with a central annular groove $B'$, which is in the center of the wheel and is formed quite deep, as is shown in Fig. 1. The wheel is also formed with two helical grooves $B^2$, which communicate at the point $B^3$ with the central groove $B'$ and which are tangent to such central groove at that point and which extend on either side of the trolley-wheel substantially to the end portions of the same. These helical grooves are right and left handed, and while I have shown both of them communicating with the central groove at a single point they might be arranged to communicate with this groove at different parts around the circumference of the wheel. Furthermore, the distance of these helical grooves from the axis of the trolley-wheel gradually decreases from the central groove, where their diameter is greatest. I have indicated in the drawings a gradual decrease in the distance of the helical grooves—that is to say, the decrease in the distance from the bottom of the groove to the axis is in proportion to the length of the groove as we proceed from the center groove to the ends of the helical grooves. In other words, the variation in diameter of the helical grooves is proportional to the length of such grooves between any two points. I have shown suitable retaining-shoulders upon the edges of the helical grooves, and these shoulders are made sufficiently high to retain the wire in position on the wheel, as will be explained. The ends of the arms $A^2$ are beveled, as shown in Fig. 1, so that the trolley-wire will be properly engaged by these parts and deflected into the grooves on the trolley-wheels.

The operation of my device is as follows: The trolley-wire normally engages the central groove and the wheel will normally act just as the ordinary trolley-wheel having a single annular groove therein; but in case of displacement of the trolley-wheel, so that it engages the trolley-wire at another place on the trolley-wheel, the contact between the wire and wheel will cause the rotation of the wheel and the trolley-wire will move up one of the helical grooves $B^2$, and therefore guide the trolley-wheel with relation to the wire, so that the wire is restored to the central groove $B'$; and since the engagement of the trolley-wire with the wheel is always in one direction—that is to say, the trolley-wire moves downward in Fig. 1 with relation to the trolley-wheel—the trolley-wire is never deflected at the point $B^3$ into the helical grooves. Since the increase of diameter of the helical groove from the end to the middle of the trolley-wheel is very slight, the angle being less than the angle of friction between the trolley-wheel and the wire, the contact between the wire and trolley-wheel even on the outer end of the trolley-wheel in the helical grooves is always sufficient to rotate the wheel and to cause the wire to be guided up the helical grooves into the central groove. Furthermore, as in my construction, the increase of diameter along the helical groove is substantially proportional to the length of the groove between any two points. This action of the trolley-wheel in restoring the wire to its proper engagement with the wheel is more perfect than with the other constructions. This may, however, vary very considerably from the exact form of helical grooves which I have shown. Since the ends of the arms A are beveled at A², if the wire comes in contact with these as the trolley jumps the wire the wire will be caught on the beveled portions of these arms and restored to the end of the helical slot B². In my construction of trolley-wheel, the wheel being formed in one piece the restoring action will be very much better than if the wheel were made of separate pieces not rotating together, because, as will be readily seen, when the trolley jumps the wire the wheel is usually rotated with considerable rapidity and the inertia of this wheel as soon as the wire comes into engagement with the grooves B² will assist the frictional action between the wheel and the wire to restore the wire to its proper engagement. I have formed the central groove B' of very considerable depth, as is seen in the drawings, so that when the wheel comes in contact with the switch-plate of ordinary construction it is impossible for the helical grooves to engage with the side edges or guard-pieces on the switch-plate, which would tend to displace the trolley with relation to the trolley-wires. The central groove must be deep enough so that the switch-plate is prevented absolutely from coming in contact with any part of the wheel except the edge of the central part of the wheel, and I form the central groove sufficiently deep to effect this in all cases and form the shoulders about the helical grooves B² with relation to this. These shoulders must of course be formed sufficiently high to give the proper grip between the trolley-wheel and the wire when the wire is in these helical grooves.

What is claimed as new is—

1. A trolley-wheel formed with a deep central annular groove, a right and left handed helical groove substantially tangent to said annular groove, said helical grooves being of varying diameter, the increase in diameter of such grooves being substantially proportional to the distance between any two points, a trolley-arm formed with a yoke at the end of the same, beveled circular bearing portions formed on said yoke, said beveled portions serving to guide said trolley with relation to the trolley-wire.

2. A trolley-wheel formed with a deep annular groove in the center of the same, a right and a left handed helical groove substantially tangent to said annular groove, said helical grooves being gradually increased in diameter from the ends to the center of said trolley-wheel, a cylindrical bearing extension formed on either end of said trolley-wheel, a trolley-arm having a yoke formed at the end of the same, bearing portions formed on said yoke having circular beveled extensions and annular grooves into which said bearing extensions on said trolley-wheel fit and a pivot-pin secured to said trolley-arm and passing through said wheel.

3. A trolley-wheel formed with a central groove inclosed by annular flanges, and right and left handed helical shoulders forming helical grooves leading into said annular groove, said annular flanges having a greater diameter than the greatest diameter of said helical shoulders.

4. A trolley-wheel formed with an annular groove inclosed by annular flanges, and a helical shoulder forming a helical groove leading into said annular groove, said annular flanges having a greater diameter than the greatest diameter of said helical shoulder.

5. A trolley-wheel formed with a central annular groove inclosed by annular flanges, and helical shoulders forming helical grooves leading into said annular groove, said annular flanges having a greater diameter than the greatest diameter of said helical shoulders; a trolley-arm formed with a yoke to support said trolley-wheel and with beveled extensions on said yoke on either side of said wheel.

WILLIAM L. VON HARDENBERG.

Witnesses:
JESSIE B. KAY,
HARRY L. DUNCAN.